(12) United States Patent
Tam

(10) Patent No.: US 12,335,433 B2
(45) Date of Patent: Jun. 17, 2025

(54) MULTI-REGION COMMUNICATION DETAIL RECORDS

(71) Applicant: Mitel Networks Corporation, Kanata (CA)

(72) Inventor: Terry Tam, Ottawa (CN)

(73) Assignee: Mitel Networks Corporation, Ottawa (CA)

( * ) Notice: Subject to any disclaimer, the term of this patent is extended or adjusted under 35 U.S.C. 154(b) by 73 days.

(21) Appl. No.: 18/070,323

(22) Filed: Nov. 28, 2022

(65) Prior Publication Data

US 2024/0179238 A1    May 30, 2024

(51) Int. Cl.
*H04M 3/00* (2024.01)
*H04L 12/66* (2006.01)
*H04M 3/22* (2006.01)
*H04M 5/00* (2006.01)

(52) U.S. Cl.
CPC ....... *H04M 3/2218* (2013.01); *H04M 3/2281* (2013.01)

(58) Field of Classification Search
CPC ........... H04M 15/41; H04M 2215/016; H04M 15/58; H04M 2203/555; H04M 2215/0164; H04M 7/0075; H04M 2215/0188; H04M 15/56; H04W 4/029; H04W 4/02; H04W 4/24; H04W 4/023; H04W 64/00; H04W 4/021; H04W 4/025; H04W 8/02
USPC ...... 379/112.01, 112.06, 220.01, 133, 14.03, 379/221.08, 114.01, 114.22, 114.21, 379/114.28; 455/456.1, 404.2, 406, 405, 455/445
See application file for complete search history.

(56) References Cited

U.S. PATENT DOCUMENTS

| | | | | |
|---|---|---|---|---|
| 5,357,564 | A * | 10/1994 | Gupta | H04M 3/38 |
| | | | | 379/112.01 |
| 7,496,185 | B1 * | 2/2009 | Primavesi | H04M 15/00 |
| | | | | 379/112.01 |
| 9,338,658 | B1 * | 5/2016 | Gailloux | H04W 12/12 |
| 11,343,373 | B1 * | 5/2022 | Bodiga | H04M 3/2236 |

(Continued)

OTHER PUBLICATIONS

EPO; Extended Search Report dated Apr. 25, 2024 in Application Serial No. 23212748.0.

(Continued)

*Primary Examiner* — Kharye Pope

(57) ABSTRACT

A computer system includes a telecommunication server of a telecommunication system operator, is configured to store and route a communication detail record (CDR), a CDR database a metadata database, and a CDR router configured to inspect/analyze the metadata in each CDR and based on the analysis route the CDR to one or more country-specific and/or region-specific CDR storage units. The computer system may also include a legal database in communication with the CDR router, wherein the legal database includes the legal requirements for CDR storage of one or more countries and/or one or more regions and a legal server configured to obtain updates to the legal requirements and store them in the legal database. A method implemented on the telecommunications system receives and stores from the telecommunication server metadata from a telecom event and saves it as a CDR. The CDR is routed, utilizing the CDR router to one or more country-specific CDR storage units.

20 Claims, 6 Drawing Sheets

(56) References Cited

U.S. PATENT DOCUMENTS

| | | | | |
|---|---|---|---|---|
| 2003/0112937 A1* | 6/2003 | Kreckel | ................ | H04M 15/58 379/114.15 |
| 2004/0172265 A1* | 9/2004 | Spragle | ............ | G06Q 10/06311 705/26.1 |
| 2005/0281399 A1* | 12/2005 | Moisey | ................ | H04M 15/73 379/114.01 |
| 2008/0043951 A1* | 2/2008 | Yap Ye | ................ | G06Q 20/16 379/114.14 |
| 2010/0034362 A1* | 2/2010 | Phelps | ............ | H04M 3/42221 379/88.19 |
| 2011/0034167 A1* | 2/2011 | Ben-Shaul | .......... | H01M 1/2757 455/432.1 |
| 2011/0051605 A1* | 3/2011 | Steiner | .............. | H04M 3/42221 370/252 |
| 2014/0051383 A1* | 2/2014 | Doerr | ...................... | H04M 3/56 455/416 |
| 2014/0293807 A1* | 10/2014 | Devolites | ............ | H04L 12/1482 370/252 |
| 2016/0300067 A1* | 10/2016 | Meredith | ............ | G06F 16/2465 |
| 2017/0034344 A1* | 2/2017 | Cukierman | ............ | H04W 4/16 |
| 2017/0366503 A1* | 12/2017 | Lee | ..................... | H04L 65/1036 |
| 2019/0312968 A1* | 10/2019 | Moon | ...................... | H04Q 3/04 |
| 2021/0058507 A1* | 2/2021 | Cornwell | ............. | G06F 18/214 |

OTHER PUBLICATIONS

Abhishek Singh et al: "Mobility Data Analysis and Applications: A mid-year 2021 Survey," arxiv.org, Cornell University Library, 201 Olin Library Cornell University Ithaca, NY 14853, Aug. 31, 2021 (Aug. 31, 2021), XP091041483, Sections 1 to 7.

Mahdizadeh Mohammad Saleh et al: "A regression framework for predicting user's next location using Call Detail Records," Computer Networks, Elsevier, Amsterdam, NL, vol. 183, Oct. 15, 2020 (Oct. 15, 2020), XP086387592, ISSN: 1389-1286, DOI: 10.1016/J.COMNET.2020.107618 [retrieved on Oct. 15, 2020] pp. 1-15.

* cited by examiner

MULTI-REGION COMMUNICATION DETAIL RECORDS

FIELD OF THE DISCLOSURE

This disclosure relates to systems and methods for routing a communication detail record (CDR) or portions thereof to one or more country-specific CDR storage units.

BACKGROUND

Countries often have country-specific privacy laws. With the advent of privacy and trade agreements at a regional and continental level (such as the General Data Protection Regulation (GDPR) and the Canada-United States-Mexico Agreement (CUSMA)), countries often agree on protocol for cross-border data transfers. There are sometimes, however, exceptions that allow regional (such as the European Union) or country privacy laws to override an agreement. It can become complicated when countries that are parties to a regional agreement have respective country-specific privacy laws that contradict each other and/or that contradict the agreement. Telecommunication (or telecom) metadata is one item for which agreements may have differing laws from countries, and for which countries themselves may have different laws. As an example, Germany and France have their own respective country-specific privacy laws that override the GDPR rules, and those country-specific laws differ regarding how long telecom metadata can be retained.

Currently, a telecom system operator (or "operator" or "service operator") may adopt the privacy laws of the country for the address in which a customer's account is based. There is a risk, however, that following such a rule would be found to be a violation of a region's or a country's privacy act.

SUMMARY

Methods and systems of this disclosure address the problem of storing telecom metadata to meet country-specific or region-specific laws. They utilize a CDR router that is capable of inspecting/analyzing CDRs (or portions thereof) and routing the CDRs to the appropriate country(ies) to meet regulatory laws governing their storage. As used herein, "law" or "laws" means any law, treaty, contract, rule, or regulation, and "CDR" means a CDR or another portion thereof.

Another example is the internet equivalent of CDRs called Internet Protocol Detail Records (IPDRs). It is foreseeable that IPDRs will have a regionalization aspect moving forward. The invention may apply to all applications that may be impacted by conflicting data sovereignty related laws. And the term CDR as used herein includes IPDRs.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION

The description of embodiments provided herein is merely exemplary and is intended for purposes of illustration only; the following description is not intended to limit the scope of the claims. Moreover, recitation of multiple embodiments having stated features is not intended to exclude other embodiments having additional or fewer features or other embodiments incorporating different combinations of the stated features. The methods and systems according to this disclosure and claims can operate in a premise, cloud-based, or hybrid environment.

A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices). In accordance with examples of the disclosure, a non-transient computer readable medium containing program can perform functions of one or more methods, modules, engines and/or other system components as described herein.

As used herein, "database" refers to any suitable database for storing information, electronic files or code to be utilized to practice embodiments of this disclosure. As used herein, "server," "processor," or "router" refers to any suitable server, processor, router, computer or computing device suitable for performing functions utilized to practice embodiments of this disclosure.

Methods and systems of this disclosure utilize a CDR router that is capable of analyzing CDRs and routing the CDRs ("CDR" includes a portion or all of a CDR) to the appropriate country or countries for storage to satisfy country and regional CDR laws. As examples, a country may only require storage of CDRs involving its citizens, or a country may require all CDRs of a telecom event in which one of its citizens participated.

Methods and systems of this disclosure can also be used to regionalize CDR based on criteria. For example, updates to regulations due to Network Information Systems (NIS) directives require proper audit logging of the distribution of CDRs.

Figure 1:
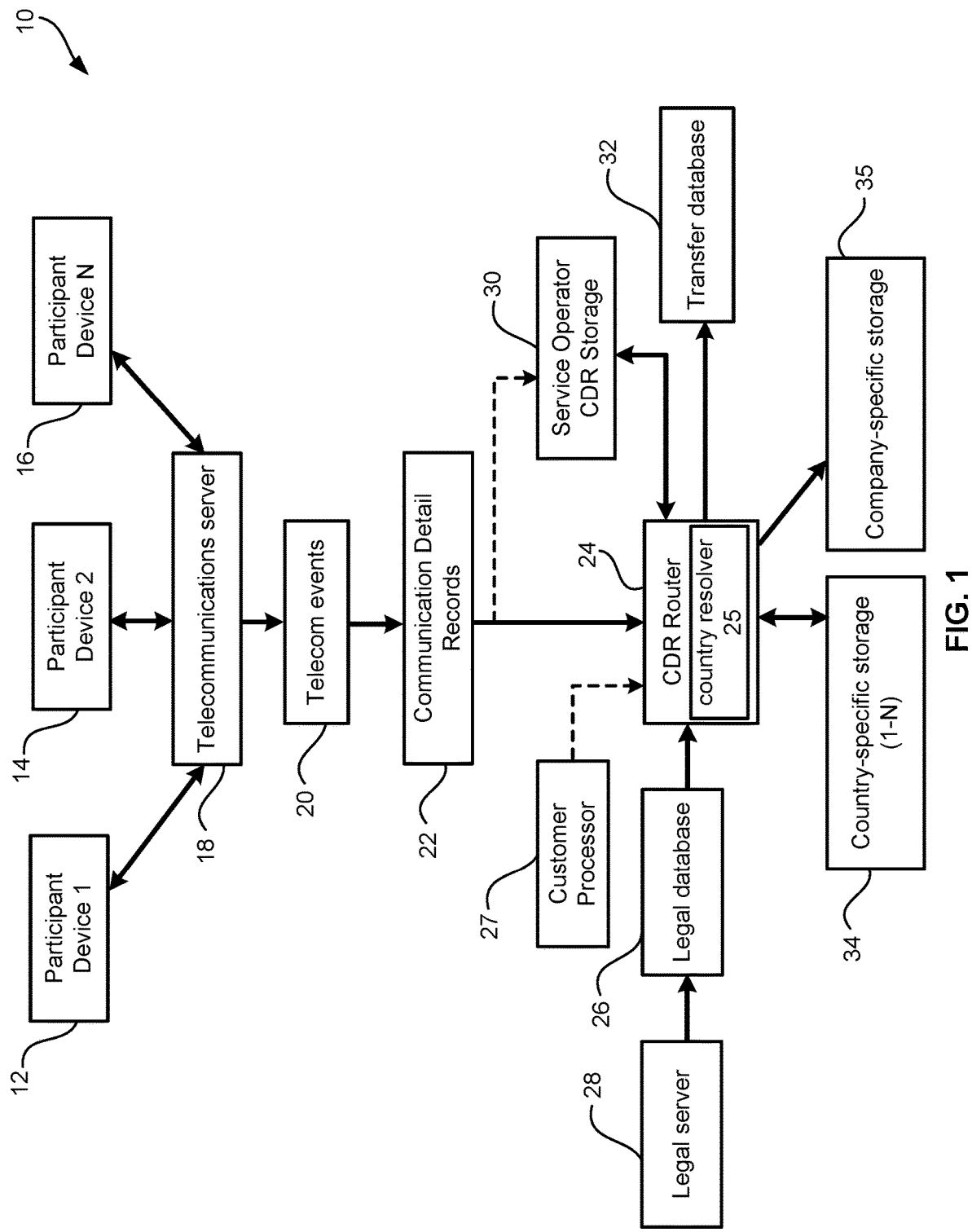
FIG. 1 illustrates an electronic system for CDR routing according to aspects of this disclosure.

Turning now to the Figures, wherein the purpose is to describe embodiments of this disclosure and not to limit the scope of the claims. FIG. 1 illustrates a system 10 according to this disclosure. System 10 includes a telecommunications server 18 that is configured to communicate with participant devices 12, 14, and 16, although the participant devices used not be part of a claimed system or method herein. When two or more participant devices 12, 14, and 16 communicate with each other through telecommunication server 18, a telecom event 20 occurs. Telecom event 20 can be a phone call or conference, a video call or conference, a text, a chat, an email, or any type of communication facilitated by telecommunications server 18. Telecommunications server 18 is operated by a service operator and is resident in a country.

When a telecom event 20 occurs, it includes metadata that forms a communication detail record (CDR) 22. The CDR includes information such as the names of the people who participated (each being a "participant") in the telecom event 20, each participant's phone number or internet protocol (IP) addresses, the name of each participant's organization, the location of each organization, the location from which each participant participated in the telecom event, the date and time that each telecom event 20 started and stopped, and the time that each participant joined and left the telecom event 20.

The CDRs 22 can either be first sent to a CDR router 24 or to a service operator storage 30. CDR router 24 is configured to analyze and route (both in the manner described herein) CDRs 22. The service operator storage 30 is any suitable electronic storage, such as those known for storing CDRs, and can be cloud-based electronic storage. Service operator storage 30 may be in communication with CDR router 24 and receive CDRs 22 directly and send CDRs 22 to CDR router 24. Or, CDR router 24 can send CDRs 22 to service operator storage 30. In some instances a CDR 22 will not be stored in service operator storage 30 because of a country or regional law prohibiting the storage.

As shown, CDR router 24 has a country resolver 25. Country resolver 25 is software that operates to (1) resolve the origin country of a participant of a telecom event 20 if that information is not in the CDR 22, and (2) adding the information. Country resolver 25 may, for example, identify the country of a participant by a participant's phone number, IP address, or the location of the participant's organization.

Country resolver as shown is resident and operates on CDR router 24 although it may be part of another processor, computer, or other device in communication with CDR router 24. Any suitable process, however, to determine the country associated with a participant may be used by country.

A legal database 26 is in communication with, and could be resident on, CDR router 24. Legal database 26 includes country and regional laws regarding the storage of CDRs 22. A legal server 28 may be utilized to update legal database 26 and legal server 28 may be part of CDR router 24 or be separate from it. Legal server 28 could be in communication with outside electronic sources to automatically obtain new laws or changed laws related to CDR storage, and could automatically update legal database 26. Alternatively, the service operator or a third party could add updates to legal database 24, in which case legal server 28 need not be used.

CDR router 24 is configured to inspect/analyze CDRs 22 and, based on the information in legal database 26, route each CDR 22 to one or more country-specific storages 34. CDR router 24 may, if required or not prohibited by the law governing the treatment of a CDR 22, also route a CDR 22 to the service operator database 30.

A transfer database 32 is in communication with CDR router 24 and may be resident on CDR router 24. Transfer database 22 maintains a log of information regarding the transfer of each CDR 22. The log may include sufficient information to identify the CDR 22, when the CDR 22 was created, when the CDR 22 was routed by CDR router 24, and to each location where the CDR 22 was routed.

A customer processor 27 is separate from system 10 but may be in constant or intermittent communication with CDR router 24 and be able to send a command or request to CDR router 24 to route a CDR 22 to a particular country storage 34 and/or to a particular customer storage 35.

Figure 2:
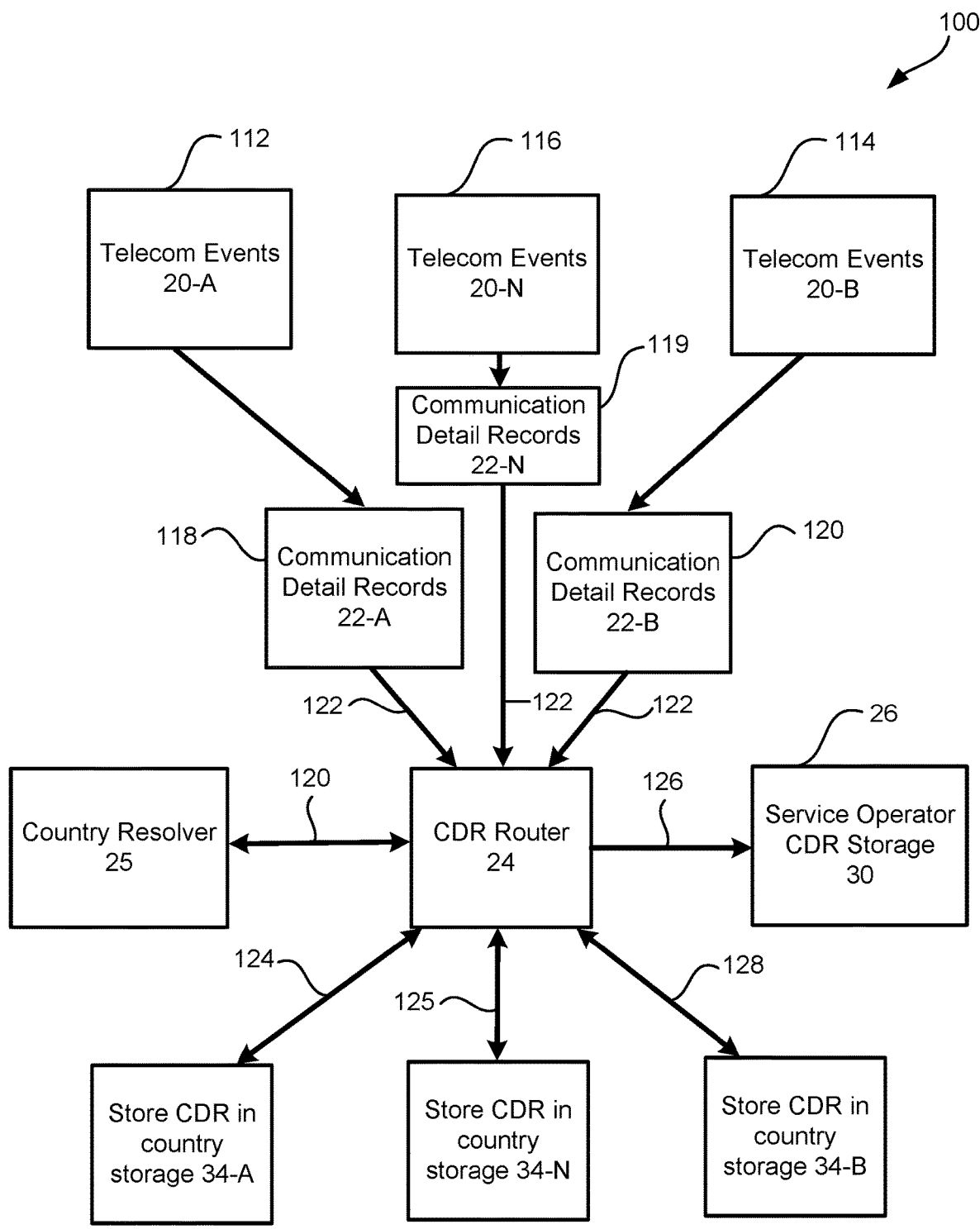
FIG. 2 illustrates a method for CDR routing according to aspects of this disclosure.

FIG. 2 shows an exemplary method 100 according to this disclosure. When customer places a call via telecommunication server 18 telecom events 112, 114, 116 are created and are typically correlated to form a CDR 22-A, 22-B, 22N (steps 118, 119, 120). CDRs 22 are typically routed CDR router 24 (step 122) and stored in the service operator storage 30 (step 126) at the service operator's location. According to any system and method of this disclosure, if the law prohibits the storage in service operator storage 30 the CDR 22 will not be stored there.

CDR router 24, which can be introduced prior to the operator's storage 30 as shown in FIG. 1, or after the service operator storage 30 as shown in FIG. 1 and FIG. 2. The CDR router 24 can inspect/analyze a CDR 22 for information about a participant's country of origin, or the country of origin of a group to which the participant belongs. Using this data, the CDR router 24 can make a copy of each CDR 22 and transmit it (steps 124, 126, 128) to the appropriate countries to satisfy country-specific or region-specific laws.

If the country origin metadata does not exist for a participant, country resolver 25 (step 120) is configured to deduce the necessary country data based on the address information typically in a CDR 22.

Figure 3:
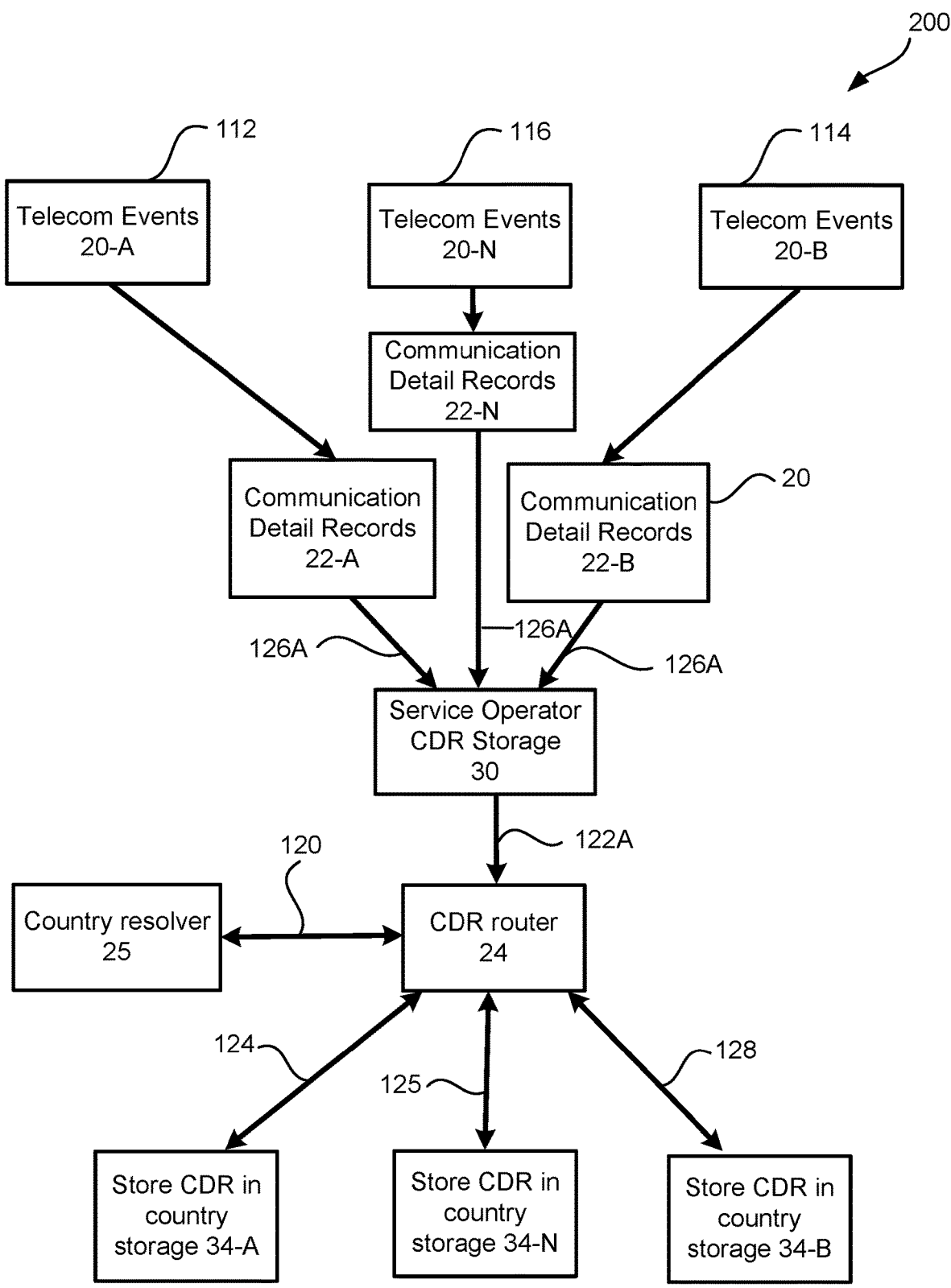
FIG. 3 illustrates an alternate method for CDR routing according to aspects of this disclosure.

FIG. 3 illustrates an alternate method to FIG. 2, in which the CDRs 22 are first routed to the service operator storage 30.

Figure 4:
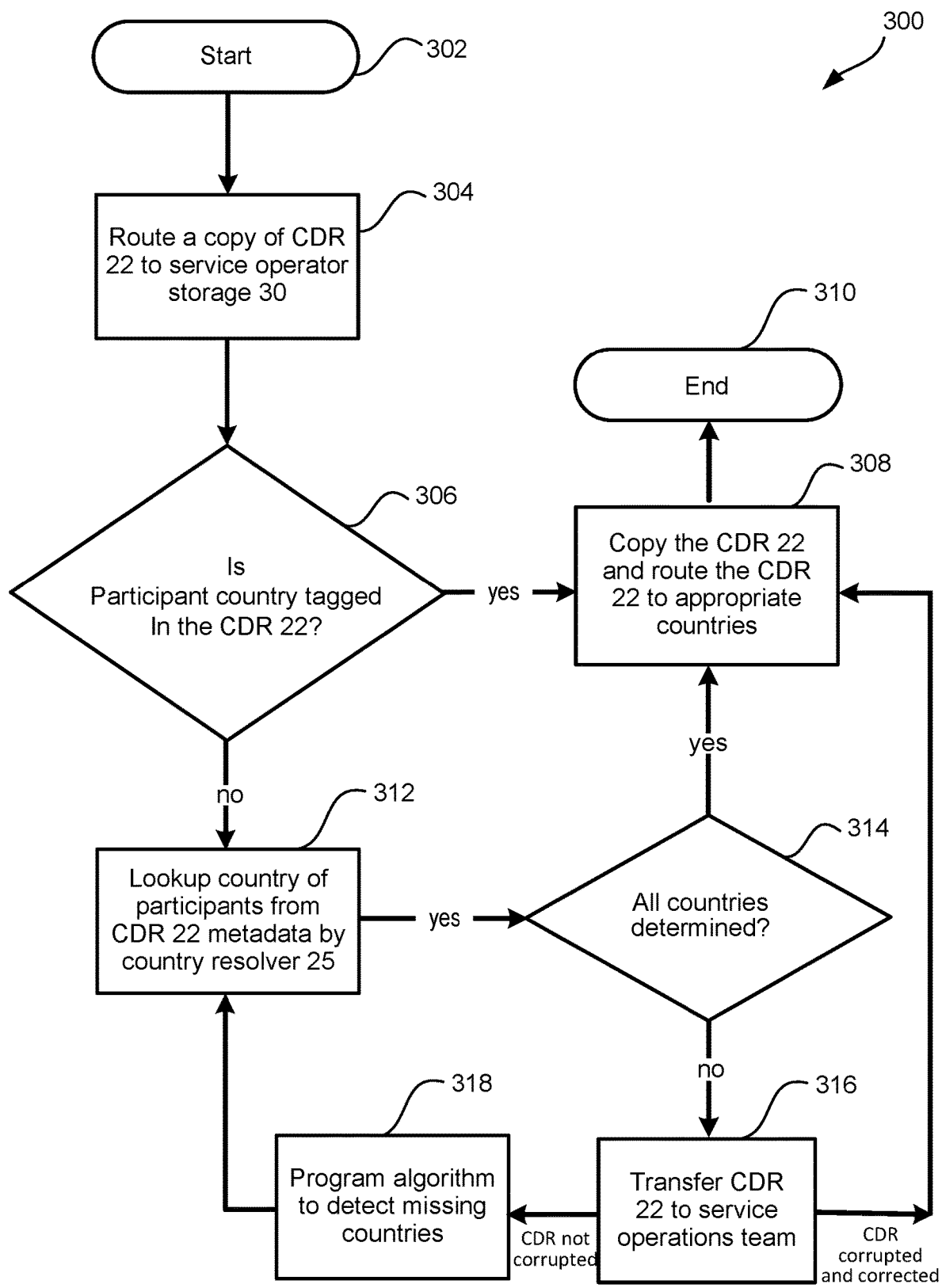
FIG. 4 illustrates an alternative method for CDR routing according to aspects of this disclosure.
Figure 5:
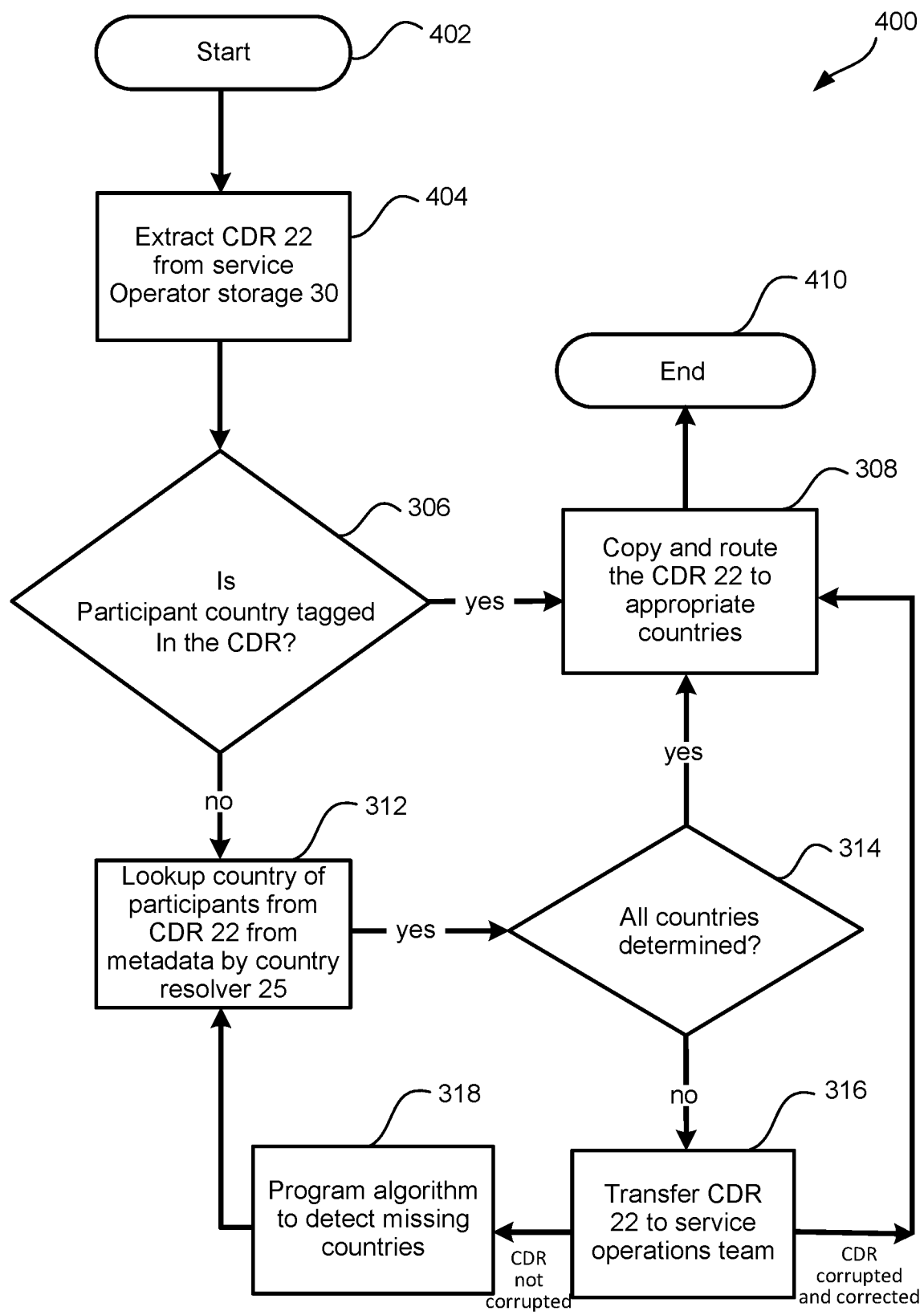
FIG. 5 illustrates an alternative method for CDR routing according to aspects of this disclosure.

FIGS. 4-5 illustrate similar methods, but in FIG. 3 the CDR 22 is sent immediately for inspections/analysis, wherein in FIG. 5 the CDR 22 is extracted from operator storage 30 and sent for inspection/analysis. As FIGS. 4-5 illustrate, the CDR router 24 copies (if required because the CDR will be routed to more than one location) at step 308 the CDR 22 and routes CDR 22 if the telecom events 20 and subsequent CDRs 22 contain the country origin metadata for the participants. At step 308 there may be three basic parameters defined on a per-country bases: (1) store CDRs 22 in a country based on participants residing in that country, (2) store all CDRs 22 in a country for a telecom event 20 that includes one or more participants who reside in that country, and/or (3) store all CDRs 22 in a country for a telecom event that includes one or more participants who reside in that country, and exclude participants that are on a country exemption list.

The first option is related to a more traditional CDR 22, which includes metadata regarding a communication between two parties—a caller and a callee. If the caller or callee in the CDR 22 resides in a particular country, a copy of the CDR 22 will be stored in that country.

Again with reference to FIGS. 4-5, if country origin metadata does not exist, the country resolver 25 is consulted at step 312. The country resolver 25 attempts to determine the country origin data from a CDR 22 and to provide a list of participant and group identifiers with their countries to the CDR router 24. The list also includes participants for which the county cannot be resolved.

For participants for which the country origin information cannot be resolved, the situation is flagged at step 316 for a service operations team to examine. The service operations team identifies the cause of the issue and fixes it by including the origin country(ies) (step 316) if the CDR 22 is corrupted. If the CDR 22 is not corrupted, and the country origin information was in the CDR 22, the service operations team can train or change (step 318) the country resolver 25 algorithm to address the issue automatically in the future.

Figure 6:
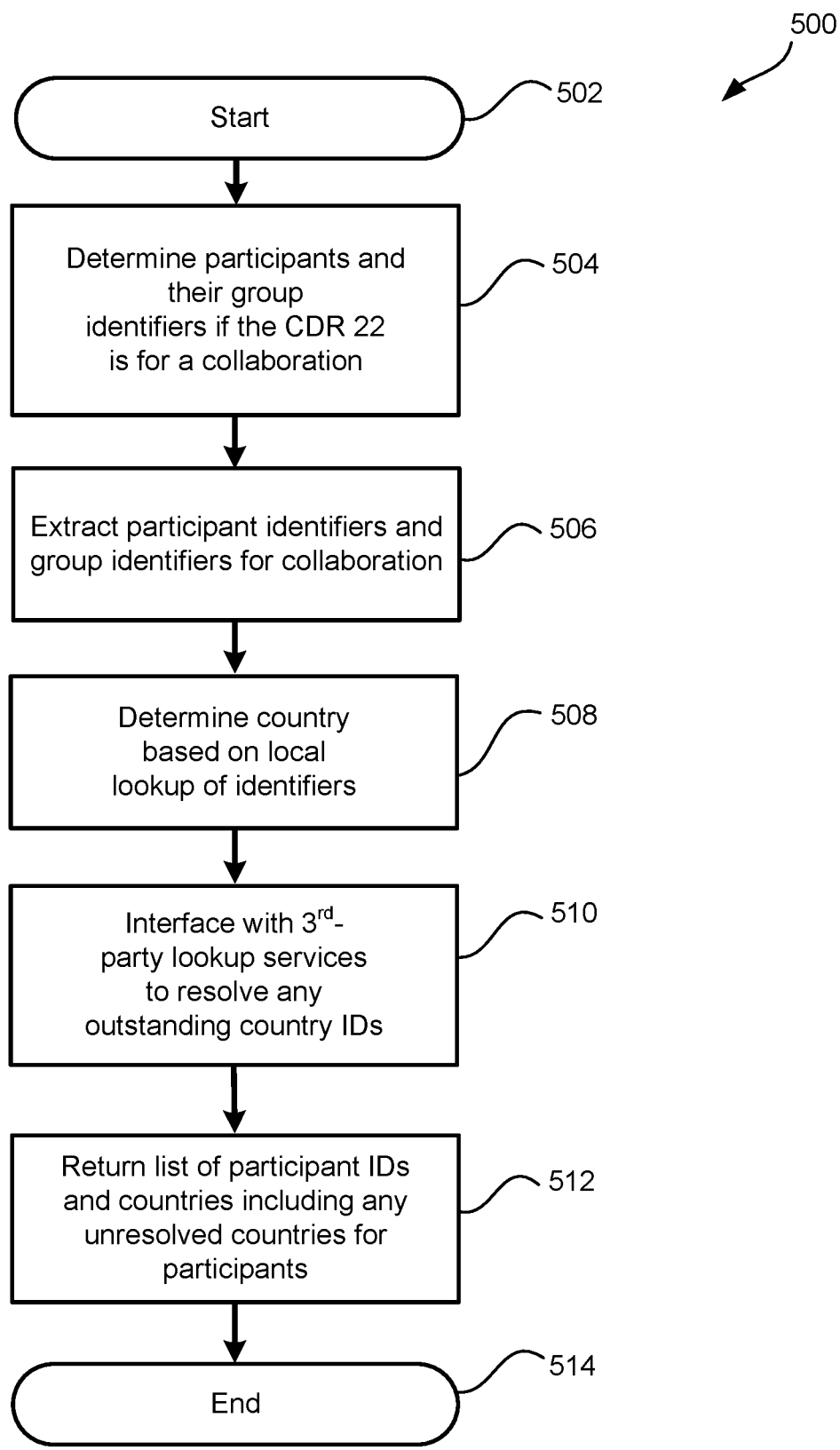
FIG. 6 illustrates an alternative method for CDR routing according to aspects of this disclosure.

Referring to FIG. 6, for the case of a collaboration scenario, at steps 504, 506 metadata of the participants of the collaborative session is extracted to determine the participants and the group of each participant. A "group" typically represents the organization to which a participant belongs and the physical location of the organization. The location could be the head office of the organization or a satellite office to which the participant is assigned. For a mere consumer or personal use, the "group" could be the respective communication service provider the participant is using.

At step 508, the country for each participant is determined based on the information found in steps 506, 508. At step 510 the system 10 interfaces with a third-party lookup service to resolve any outstanding country IDs for participants. Alternatively, method 500 may utilize country resolver 25 before or after step 510 and/or transfer a CDR 22 to the service operations team to resolve the origin country for a participant. Utilizing the country resolver 25 or the service operations team could be done prior to or after sending the CDR 22 to a third-party country lookup service. At step 512 the CDR 22 with all participant IDs is returned to CDR router 24 for routing.

The following example illustrates a case of utilizing a method and system of this disclosure.

Example 1

Company A has offices in the UK, Germany, and France. Company A uses a Meet service hosted by a service operator, which is based in Germany. The retention law for CDRs 22 is one year for the UK and France, and ten days for Germany. There are three C-level employees (or participants) (Tom from the UK, Noah from France, and Hannah from Germany) from Company A that participate in the Meet (which is a telecom event 20). The Meet lasts for one hour. After the Meet three CDRs 22 are generated as follows:

CDR 22-1: Tom joining the meet for one hour. CDR 22-1 is routed by CDR router 24 of the service operator of the Meet to country storage 34 in the UK for a retention of one year.

CDR 22-2: Noah joining the Meet for fifty-seven minutes. CDR 22-2 is routed by CDR router 24 of the service operator of the Meet to country storage 34 in France for a retention of one year.

CDR 22-3: Hannah joining the Meet for thirty minutes. CDR 22-3 is routed by CDR router 24 of the service operator of the Meet to county storage 34 in Germany for a retention of ten days.

Further, a copy of each of the three CDRs 22-1, 22-2, and 22-3 is routed by CDR router 24 of the service operator of the Meet to country storage 34 in Germany with a retention of ten days to satisfy the service operator's legal requirements as an operator in Germany The Meet is re-convened days later and two participants were invited. One participant (Jerry) is a contractor from a Company B located in Sweden. Company B is registered with the service operator of the Meet service in this example. The second participant (Samantha) is not registered with the service operator of the Meet service and will be joining the Meet as a guest user. The Meet application can determine the country of origin of any user registered with the Meet service. It is not possible to determine the country of origin of the guest user (Samantha) in this example.

The Meet lasts one hour. After the Meet five CDRs 22 are generated, which include:

CDR 22-4: Tom joining the one-hour Meet. This CDR 22-4 is routed by CDR router 24 of the service operator of the Meet to country storage 34 in the UK for a retention of one year.

CDR 22-5: Noah joining the Meet for sixty minutes. This CDR 22-5 is routed by CDR router 24 of the service operator of the Meet to country storage 34 in France for a retention of one year.

CDR 22-6: Hannah joining the Meet for fifty minutes. This CDR 22-6 is routed by CDR router 24 of the service operator of the Meet to country storage 34 in Germany for a retention of ten days.

CDR 22-7: The Meet service recognized Jerry and determined the customer account to which he belongs. CDR 22-7 is generated detailing Jerry joining the Meet for twenty minutes. This CDR is routed by CDR router 24 of the service operator of the Meet to country storage 34 in Sweden for a retention of the time required by Sweden.

CDR 22-8: CDR 22-8 is created for Samantha who joined the Meet for ten minutes. All external guest access is routed by CDR router 24 of the service operator of the Meet to the country storage 34 in which the Meet service is hosted (Germany in this case for a retention of ten days).

A copy of each of the CDRs 22-4, 22-5, 22-6, 22-7, and 22-8, are routed by CDR router 24 of the service operator of the Meet to storage in Germany with a retention of ten days to meet the service operator's legal requirements as an operator in Germany.

A week later, Tom added an attachment to the chat for the Meet while other participants were offline. A short time later, Noah and Hannah downloaded the attachment.

The CDRs created and the location of the various CDRs includes:

CDR 22-9: CDR 22-9 includes details of Tom uploading the attachment and Noah and Hannah reading the attachment, and is routed by CDR router 24 of the service operator of the Meet to country storage 34 in the UK with a retention of one year.

CDR 22-10: CDR 22-10 includes details of Noah and Hannah downloading the attachment and Tom uploading the attachment, and is routed by CDR router 24 of the service operator of the Meet to country storage 34 in France with a retention of one year.

CDR 22-11: CDR 22-11 includes details of Hannah downloading the attachment, and is routed by CDR router 24 of the service operator of the Meet to country storage 34 in Germany with a retention of ten days.

CDRs 22-9, 22-10, and 22-11: The service operator (because it is a service operator) routes by its CDR router 24 a copy of all three CDRs 22-9, 22-10, and 22-11 to country storage 34 in Germany with a retention of ten days to meet the service operator's legal requirements as an operator in Germany.

The systems and methods disclosed herein collectively address the needs of meeting users by getting more utility out of the information that is supplied to collaboration and event scheduling applications. Furthermore, the methods and ideas disclosed allow users to increase their productivity based on the detection of such information and by applying techniques not traditionally used in meeting applications to create a more results-oriented experience that is more engaging and to make meetings more effective.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may be standalone or combined in any combination. It will be recognized that changes and modifications may be made to the exemplary embodiments without departing from the scope of the present invention. These and other changes or modifications are intended to be included within the scope of the present invention, as expressed in the following claims.

What is claimed is:

1. A computer system configured to store and/or route portions of a communication detail record (CDR), wherein the computer system comprises:
   a telecommunication server of a telecommunication system operator, wherein the telecommunication server is configured to facilitate a communication;
   a metadata database communicating with the telecommunication server, wherein the metadata database is configured to store metadata of the communication as a CDR; and
   a CDR router configured to analyze the metadata in each CDR to determine a participant country of origin or a country of origin of a participant group, the metadata comprising a participant name, a phone number, internet protocol (IP) addresses, a participant organization, an organization location, a location from which each participant participated in a telecom event, a date and time each telecom event started and stopped, and a time that each participant joined and left the telecom event, and based on analyzing the metadata, automatically route the CDR to (a) a telecommunication system operator CDR storage unit, and (b) one or more country-specific and/or region-specific CDR storage units.

2. The system of claim 1, wherein the communication is a phone call, a video conference, a text, or an email.

3. The computer system of claim 1, wherein the CDR router is further configured to route the CDR from the telecommunication system operator CDR storage unit to one or more country specific CDR storage units and/or region-specific CDR storage units based on either (a) an analysis of the metadata of the CDRs, or (b) a request to the CDR router from a country-specific server or a region-specific server.

4. The computer system of claim 1 that further includes a legal database in communication with the CDR router, wherein the legal database includes the legal requirements for CDR storage of one or more countries and/or one or more regions.

5. The computer system of claim 4 that further includes a legal server in communication with the legal database, wherein the legal server is configured to obtain updates to the legal requirements and store them in the legal database.

6. The computer system of claim 1, wherein the telecommunication system operator is a communication service provider.

7. The computer system of claim 1 that further comprises a transfer database in communication with the CDR router, and the CDR router is further configured to (a) create a record for each routed CDR, wherein the transfer record comprises information regarding a routing of the CDR, and (b) store the transfer record in the transfer database.

8. The computer system of claim 1, wherein each CDR comprises country-origin metadata of a communication by one or more of: the participant, the participant group, the participant organization, an organization head office, an organization satellite office at which a participant works, the telecommunication system operator the participant used, and a billing address.

9. A computer method operable on a telecommunications system for routing a CDR, wherein the computer method comprises the following steps:
   a metadata database receiving, from a telecommunication server of a telecommunication system operator, metadata from a communication that occurs on the telecommunication server;
   the metadata database storing the metadata as a CDR; and
   routing, based on analysis of the metadata utilizing a CDR router to determine a participant country of origin or the country of origin of a participant group, the metadata comprising a participant name, a phone number, internet protocol (IP) addresses, a participant organization, an organization location, a location from which each participant participated in a telecom event, a date and time each telecom event started and stopped, and a time that each participant joined and left the telecom event, the CDR to (a) a telecommunication system operator CDR storage unit, and (b) one or more country-specific CDR storage units and/or one or more region-specific CDR storage units.

10. The computer method of claim 9 that further includes the steps of:
    utilizing a legal server in communication with a legal database, determining one or more county or regional laws pertaining to storing CDR; and
    the CDR router routing the CDR to one or more country-specific CDR storage units and/or one or more region-specific CDR storage units based on the one or more country or regional laws pertaining to storing CDR.

11. The computer method of claim 9 that further comprises the steps of:
    the CDR router receiving from a country-specific server or a region-specific server a request to route a CDR;
    the CDR router checking cross-border transfer agreements stored in a legal database; and
    utilizing the CDR router, determine the metadata in the requested CDR and, if the request does not violate a cross-border transfer agreement, routing the requested CDR to the country specific CDR storage unit or region-specific CDR storage unit.

12. The computer method of claim 9 that further includes the step of, by utilizing a legal server in communication with a legal database, determining to which country-specific CDR storage unit or region-specific CDR storage unit each piece of metadata in a CDR must be routed.

13. The computer method of claim 9 that further includes the step of the CDR router transferring a CDR from the metadata database based on a communication by a customer processor to the CDR router.

14. The computer method of claim 9 that further includes the step of deleting the CDR from the metadata database if the CDR is routed to a country-specific CDR storage unit or a region specific CDR storage unit.

15. A computer system configured to route a CDR, wherein the computer system comprises:
    a telecommunication server of a telecommunication system operator, wherein the telecommunication server is configured to facilitate a communication;

a metadata database in communication with the telecommunication server, wherein the metadata database is configured to store metadata of the communication as a CDR, wherein the CDR includes country information for one or more countries associated with the CDR, wherein the metadata comprising a participant name, a phone number, internet protocol (IP) addresses, a participant organization, an organization location, a location from which each participant participated in a telecom event, a date and time each telecom event started and stopped, and a time that each participant joined and left the telecom event;

a CDR router configured to analyze the metadata in the CDR to determine a participant country of origin or a country of origin of a participant group and, based on the analysis, route the CDR to (a) a telecommunication system operator CDR storage unit, and (b) one or more country-specific or region-specific CDR storage units; and a country resolver in communication with the CDR router, wherein the country resolver is configured to determine a country associated with a CDR if the CDR lacks the country information, wherein the determination is based on an analysis by the country resolver of the metadata of the CDR.

16. The computer system of claim 15, wherein the CDR router is further configured to route the CDR to the one or more country-specific CDR storage units or region-specific CDR storage units and to not store the CDR in the telecommunication system operator CDR storage unit.

17. The computer system of claim 15, wherein the CDR router is further configured to:
analyze the CDR for details of participants' respective country (ies) of origin, and/or the country of a group or organization to which a participant belongs, and based on the details route a copy of the CDR to the one or more country-specific CDR storage units or region-specific CDR storage units.

18. The computer system of claim 15, wherein the country resolver is further configured to provide to a service operations team an identification of participants in a CDR whose country cannot be resolved in order for the service operations team to (a) determine if the CDR is corrupted and if so, uncorrupt the CDR, and/or (b) program an algorithm of the country resolver to modify a function of the country resolver in order to automatically uncorrupt a similar CDR in the future.

19. The computer system of claim 17, wherein the CDR router is further configured to automatically route a copy of the CDR to a country-specific CDR storage unit or region-specific CDR storage unit in which the participant resides, and exclude from the routed CDR metadata related to participants on a country exemption list.

20. The computer system of claim 15 that is further configured to exclude CDR storage in either the telecommunication system operator CDR storage unit, a country-specific CDR storage unit, or a region-specific CDR storage unit if the storage is prohibited by the laws of any country or region.

\* \* \* \* \*